United States Patent Office 3,558,776
Patented Jan. 26, 1971

3,558,776
PHARMACEUTICAL COMPOSITION COMPRISING 17α - ETHYNYL - 17β - HYDROXY - 7α - METHYL-5(10)-ESTRENE-3-ONE
J Allan Campbell, John C. Babcock, and John E. Pike, Kalamazoo, Mich., assignors to The Upjohn Company, Kalamazoo, Mich., a corporation of Delaware
No Drawing. Continuation-in-part of application Ser. No. 623,223, Mar. 15, 1967. This application June 14, 1968, Ser. No. 736,949
Int. Cl. C07c 169/08
U.S. Cl. 424—243
4 Claims

ABSTRACT OF THE DISCLOSURE

This invention relates to the novel gonadotropin inhibiting (anti-fertility) compounds, $\Delta^{5(10)}$ - 3 - keto - 7α-methyl-17β-hydroxy-17α-alkynylestrenes, having the Formula VIII

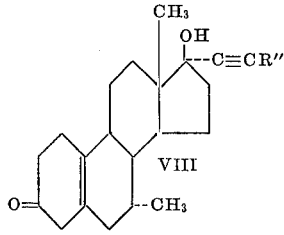

wherein R" is selected from the group consisting of hydrogen and alkyl of from one through four carbon atoms.

CROSS REFERENCE TO RELATED APPLICATIONS

This application is a continuation-in-part of application Ser. No. 623,223, filed Mar. 15, 1967, now Pat. No. 3,515,719.

BRIEF SUMMARY OF THE INVENTION

The novel compounds of this invention, namely, $\Delta^{(10)}$-3-keto-7α-methyl-17β-hydroxy-17α-alkynylestrenes (VIII), and processes for their preparation are illustratively rep-represented by the following sequence of formulae:

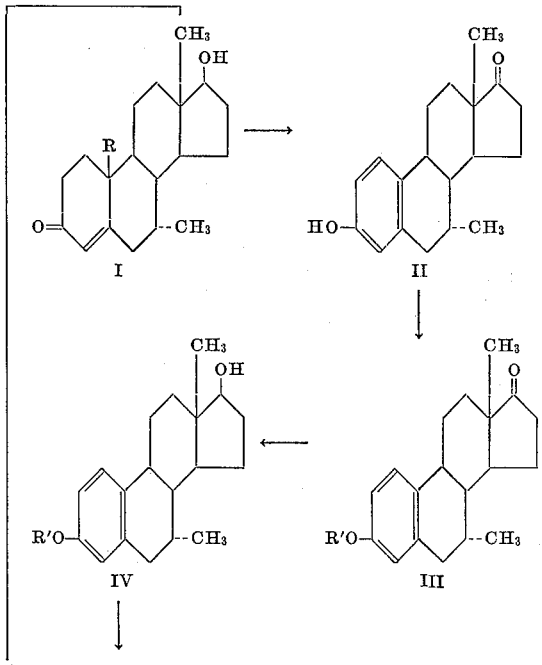

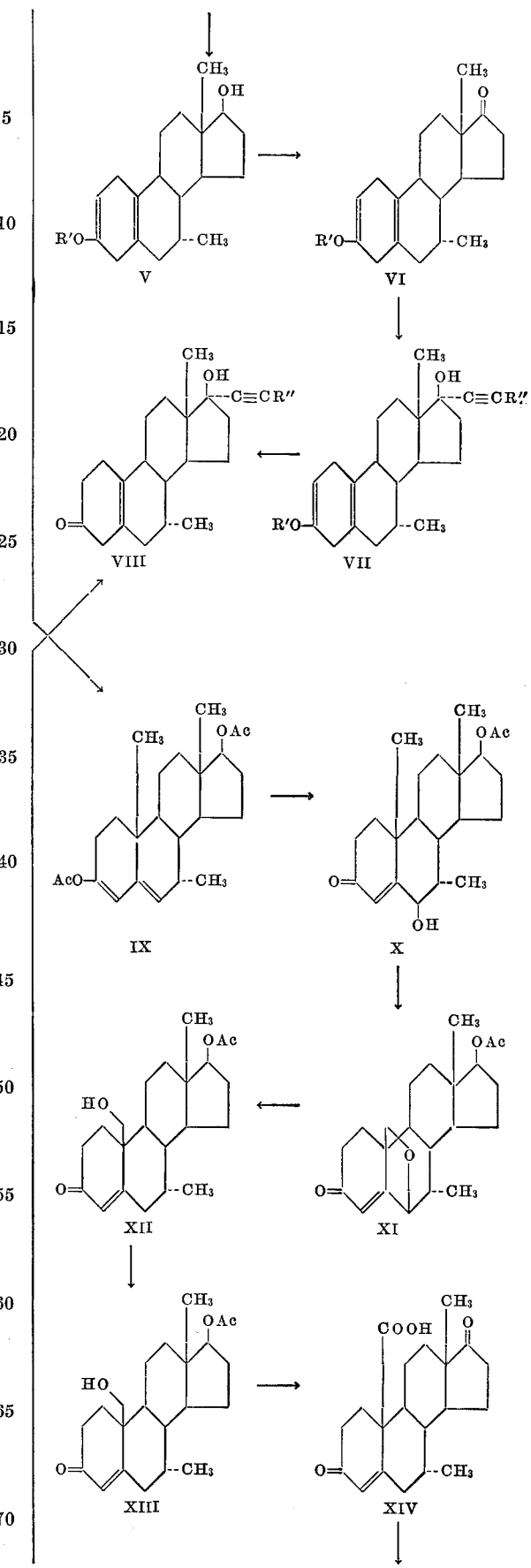

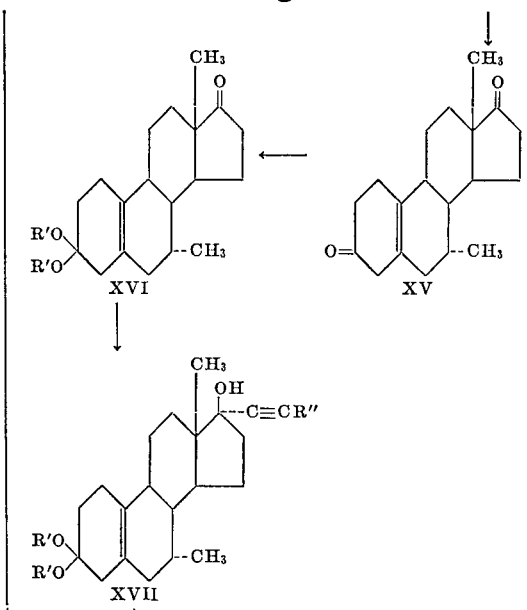

wherein R is selected from the group consisting of hydrogen and methyl, R' is alkyl of from one through eight carbon atoms, R" is selected from the group consisting of hydrogen and alkyl of from one through four carbon atoms, and Ac is the acyl radical of an organic carboxylic acid containing from one through twelve carbon atoms.

The physiologically active compounds of Formula VIII, i.e., $\Delta^{5(10)}$ - 3 - keto-7α-methyl-17β-hydroxy-17α-alkynyl-estrenes, are prepared from the known steroids of Formula I, above, by methods A or B that follow.

METHOD A (Formula I→II→III→IV→V→VI→VII→VIII of the flow-sheet, above.)

(1) Fermenting 7α-methyl-19-nortestosterone (the known compound of Formula I wherein R is hydrogen) with a microorganism or its enzymes capable of introducing a double bond in the 1(2)- or 1(2)- and 4(5)-positions of the steroid nucleus, e.g., *Corynebacterium simplex* or *Septomyxa affinis*, yields 7α-methylestrone (II).

(2) Treating the thus produced 7α-methylestrone (II) with an alkylating agent (e.g., a dialkylsulfate) in conventional manner, gives a 3-alkyl ether thereof such as 7α-methylestrone 3-methyl ether (III).

(3) The reduction of the 17-carbonyl group of a 7α-methylestrone 3-alkyl ether (III) yields a corresponding 17β-hydroxy compound; e.g., treating 7α-methylestrone 3-methyl ether (III) with sodium borohydride at moderate (room) temperature, gives 7α-methylestradiol 3-methyl ether (IV).

(4) Subjecting a 7α-methylestradiol 3-alkyl ether (IV) to the Birch reduction, for example, by adding it (in an inert solvent such as tetrahydrofuran or ether) to liquid ammonia, followed by the addition (at low temperature) of an alkali metal (such as lithium) and then an alkanol (such as methanol, ethanol or t-butanol) produces the corresponding $\Delta^{2,5(10)}$-compound (V); by following the foregoing procedure, 7α-methylestradiol 3-methyl ether (V) is converted to 7α-methyl-3-methoxy-17β-hydroxy-$\Delta^{2,5(10)}$-estradiene (V).

(5) Oxidation of the 17β-hydroxyl group of a thus produced compound of Formula V, preferably by the Oppenauer method, e.g., by treating such a compound (V) with an aluminum alkoxide and a ketone in the presence of an anhydrous organic solvent such as benzene, toluene, petroleum ether, dioxane and the like, yields the corresponding 17-ketone (VI). By following the aforesaid procedure, treating a toluene solution 7α-methyl-3-methoxy-17β-hydroxy-$\Delta^{2,5(10)}$-estradiene (V) with aluminum isopropoxide and cyclohexanone, yields 7α-methyl-3-methoxy-17-keto-$\Delta^{2,5(10)}$-estradiene (VI).

(6) The 7α-methyl-17α-alkynyl-17β-hydroxy-3-alkoxy-$\Delta^{2,5(10)}$ estradienes (VII) are prepared from the corresponding 7α - methyl-3-alkoxy-17-keto-$\Delta^{2,5(10)}$-estradienes (VI) by the following methods, which are well known in the steroid art.

(a) By treating a 7α-methyl-3-alkoxy-17-keto-$\Delta^{2,5(10)}$-estradiene (VI) with an alkali metal derivative such as sodium acetylide, potassium acetylide, sodium or potassium methylacetylide, sodium or potassium ethylacetylide, sodium or potassium propylacetylide, sodium butylacetylide, etc., in the presence of an inert solvent such as dioxane, dimethylformamide or dimethylsulfoxide, to yield the corresponding 7α-methyl-17α-alkynyl-17β-hydroxy-3-alkoxy-$\Delta^{2,5(10)}$-estradiene (VII).

(b) By treating a 7α-methyl-3-alkoxy-17-keto-$\Delta^{2,5(10)}$-estradiene (VI) with lithium acetylide (or methylacetylide, propylacetylide or butylacetylide)-ethylenediamine complex, preferably at low temperature, in such solvents as dimethylsulfoxide, dimethylformamide, tetrahydrofuran, toluene and other unreactive organic solvents, to give a corresponding 7α-methyl-17-alkynyl-17β-hydroxy-3-alkoxy-$\Delta^{2,5(10)}$-estradiene (VII).

(c) By heating a 7α-methyl-3-alkoxy-17-keto-$\Delta^{2,5(10)}$-estradiene (VI) with an alkynylmagnesium halide (prepared by slowly passing a gas such as acetylene, methylacetylene, propylacetylene, butylacetylene, etc., through an ethereal solution of an alkylmagnesium halide such as methylmagnesium bromide) in the presence of a solvent such as tetrahydrofuran, ether, benzene, etc., to yield a corresponding 7α - methyl - 17α-alkynyl-17β-hydroxy-3-alkoxy-$\Delta^{2,5(10)}$-estradiene (VII).

By following one of the procedures outlined in (a), (b) or (c), above, 7α-methyl-17-keto-$\Delta^{2,5(10)}$-estradiene 3-methyl ether (VI) is converted to 7α-methyl-17α-ethynyl-17β-hydroxy-$\Delta^{2,5(10)}$-estradiene 3-methyl ether (VII).

(7) Hydrolysis of a thus produced 7α-methyl-17α-alkynyl - 17β-hydroxy-3-alkoxy-$\Delta^{2,5(10)}$-estradiene (VII), for example, with an alkanol (such as methanol), water and a weak acid (such as oxalic acid, malonic acid, acetic acid or propionic acid), yields a corresponding $\Delta^{5(10)}$ - 3-keto-7α-methyl-17β-hydroxy-17α-alkynylestrene (VIII). By following this procedure, 7α-methyl-17α-ethynyl-17β-hydroxy-3-methoxy-$\Delta^{2,5(10)}$-estradiene (VII) is converted to $\Delta^{5(10)}$-3-keto-7α-methyl-17β-hydroxy-17α-ethynylestrene (VIII).

METHOD B (Formula I→IX→X→XI→XII→XIII→XIV→XV→XVI→XVII→VIII of the flow-sheet, above.)

(1) Treating 7α-methyltestosterone (the known compound of Formula I wherein R is methyl) with an acylating agent, for example, an anhydride, a chloride or bromide of an organic carboxylic acid, preferably a hydrocarbon carboxylic acid containing from one to twelve carbon atoms, inclusive, in the presence of an acid catalyst such as para-toluenesulfonic acid, sulfuric acid, perchloric acid and the like, or an isopropenyl acylate wherein the acyl group is that of an organic carboxylic acid as defined above, yields a 7α-methyl-3,5-androstadiene-3,17β-diol 3,17-diacylate (IX).

(2) The second step of the process is the oxidation of a 3,5-androstadiene 3,17-diacylate (IX), e.g., by reaction with an organic peracid such as perpthalic acid, to yield a 7α-methyl-6β,17β-dihydroxy-4-androsten-3-one 17-acylate (X). The reaction is carried out in an inert organic solvent or mixture thereof, such as diethyl ether, chloroform, ethylene dichloride, dibutyl ether or tetrahydrofuran.

(3) This step of the process involves the 6β,19-epoxidation of a 6β-hydroxyl compound of Formula X, namely, by its light catalyzed (e.g., by ultraviolet irradiation) reaction (in an inert organic solvent such as benzene)

with lead tetraacetate, resulting in the production of a 7α-methyl-17β-hydroxy-6β,19-epoxy-4-androsten-3-one 17-acylate (XI).

(4) In the fourth step of the process the 6β,19-epoxide function of a compound of Formula XI is reduced, for example, by heating said compound with zinc dust and acetic acid, to give 7α-methyl-17β,19-dihydroxy-4-androsten-3-one 17-acylate (XII).

(5) In the next step of the process a 7α-methyl-17β,19-dihydroxy-4-androsten-3-one 17-acylate (XII), produced as in the immediately preceding paragraph, has its 17-acylate group hydrolyzed, for example, by heating the compound (XII) (e.g., at reflux) in an essentially oxygen-free solution of a lower alkanol (e.g., absolute methanol) containing a strong acid (e.g., hydrochloric acid) to yield 7α-methyl-17β,19-dihydroxy-4-androsten-3-one (XIII).

(6) The sixth step of the process involves the oxidation of the 17β- and 19-hydroxy functions of the compound of Formula XIII, for example, with chromic acid, to yield 7α-methyl-3,17-dioxo-4-androsten-19-oic acid (XIV).

(7) In this step 7α-methyl-3,17-dioxo-4-androsten-19-oic acid (XIV) is decarboxylated, for example, by treatment with a tertiary nitrogen base (e.g., pyridine) at moderate temperature (e.g., 50° C.) to give 7α-methyl-5(10)-estrene-3,17-dione (XV).

(8) The eighth step of the process provides for the 3-dialkyl-ketalization of 7α-methyl-5(10)-estrene-3,17-dione (XV), for example, by its treatment in a lower alkanol (e.g., methanol) solution containing a weak organic acid e.g., malonic acid) at about room temperature (e.g., 20 to 25° C.) to yield a 7α-methyl-5(10)-estrene-3,17-dione 3-dialkyl ketal (XVI).

(9) In this step of the process a 7α-methyl-5(10)-estrene-3,17-dione 3-dialkyl ketal (XVI) is converted to the corresponding 7α-methyl-17β-hydroxy-17α-alkynyl-5(10)-estren-3-one 3-dialkyl ketal (XVII) by employing essentially the procedures described in step (6) of Method A, above.

(10) Hydrolyzing a 7α-methyl-17β-hydroxy-17α-alkynyl-5(10)-estren-3-one-dialkyl ketal (XVII), e.g., by treating it with a weak organic acid e.g., oxalic, malonic, etc.) in an aqueous-organic solvent mixture, e.g., aqueous methanol or aqueous acetone at room temperature, yields a corresponding Δ$^{5(10)}$-3-keto-7α-methyl-17β-hydroxy-17α-alkynylestrene (VIII). By employing the foregoing procedure, 7α-methyl-17β-hydroxy-17α-ethynyl-5(10)-estren-3-one 3-dimethyl ketal (XVII) is converted to Δ$^{5(10)}$-3-keto-7α-methyl-17β-hydroxy-17α ethynylestrene (VIII).

All of the compounds embraced by Formulae II through XVII can be isolated from their respective reaction mixtures by conventional means, for example, when a water-miscible solvent is used, by pouring the reaction mixture into water and separating the resultant precipitate by filtration. Additional purification of the product can be accomplished by conventional methods, for example, by single solvent elution chromatography from an adsorbent column with suitable solvent, such as, acetone, methanol, dilute methanol, ethanol, ethylene chloride; also by gradient elution chromatography from an adsorbent column with a suitable mixture of solvents, such as, methylene chloride-Skellysolve B (hexanes), acetone-Skellysolve B, and the like.

The compounds of Formula VIII of the present invention are potent gonodatropin inhibiting (anti-fertility) agents; e.g., when assayed orally in mature, fertile, female rats by standard procedures, Δ$^{5(10)}$-3-keto-7α-methyl-17β-hydroxy-17α-ethynylestrene (VIII) was found to have approximately three times the activity of its known 7-desmethyl counterpart. This property makes the new compounds useful in veterinary practice.

The compounds represented by Formula VIII of the flow-sheet shown above can be be prepared and administered to mamals, birds and animals in a wide variety of oral and parenteral dosage forms, singly or in admixture with other coacting compounds. They can be administered with a pharmaceutical carrier which can be a solid material or liquid, in which the compound is dissolved, dispersed or suspended. The solid composition can take the form of tablets, powders, capsules or the like, preferably in unit dosage forms for simple administration or precise dosages. The liquid compositions can take the form of solutions, emulsions, suspensions, syrups or elixirs.

DETAILED DESCRIPTION

In is to be understood that the invention is not to be limited to the exact details of operation or exact compositions shown and described herein, as obvious modifications and equivalents will be apparent to one skilled in the art, and the invention is therefore to be limited only by the scope of the appended claim.

METHOD A

EXAMPLE 1

7α-methylestrone(7α-methyl-1,3,5(10)-estratrien-3-ol-17-one) (II)

To 10 l. of a sterile glucose-yeast extract medium there is added an inoculum of 500 ml. of *Corynebacterium simplex* ATCC 6946. The culture is stirred and aerated for about 48 hours at a temperature of about 28° C., lard oil being added to suppress the foam. After about 48 hours the pH is 6.1. To the fermentor, 1 g. of 7α-methyl-19-nortestosterone (I), prepared as in Steroids 1, 317, is added and aeration continued for about 24 hours. At this time the pH is 6.5. The beer is adjusted to pH3 with hydrochloric acid and extracted four times with 3 l. of methylene chloride. Paper chromatography of an aliquot of the solvent extract indicates, by the Bush B-3 system, that essentially all of the 7α-methyl-19-nortestosterone (I) is reacted and that two compounds showing the characteristics of aromatic A ring steroids are present. The less polar compound has the mobility of 7α-methylestrone (II) and the more polar that of 7a-methylestradiol. The methylene chloride extracts are evaporated to dryness and the residues obtained used for isolating the fermentation products. The crude residue is dissolved in methylene chloride and chromatographed through a 150 gm. Florisil (synthetic magnesium silicate) column packed wet with Skellysolve B (hexanes) and eluted with 400 ml. fractions by gradient elution between 5 l. of 4% acetone-Skellysolve B and 5 l. of 12% acetone-Skellysolve B. Fractions 4 through 7 give well formed crystals. These fractions are combined and recrystallized from methanol with Darco (activated charcoal) treatment to give 0.45 g. of 7α-methylestrone (II), melting at 237 to 238° C.;

$\lambda_{max}^{alc.}$ 280 mμ; ε=2,100

*Analysis.*—Calcd. for $C_{19}H_{24}O_2$: C, 80.21; H, 8.51. Found: C, 80.10; H, 8.34.

EXAMPLE 2

7α-methylestrone (II)

A sterile medium is prepared containing 10 l. of tap water, 20 g. of cornsteep liquors and 100 g. of commercial dextrose and adjusted to pH 5 with sodium hydroxide. This is inoculated with 500 ml. of a vegetable growth of *Septomyxa affinis* (ATCC 6737) grown on the same medium. The culture is stirred and aerated at a rate of 0.1 l./minute. At the end of about 24 hours the pH is 7. To the fermentor, 2 g. of 7α-methyl-19-nortestosterone (I) and 0.1 g. of 3-keto-bisnor-4-cholen-22-al dissolved in 20 ml. of N,N-dimethylformamide is added. Aeration is continued for about 48 hours, the pH adjusted to 3 and the beer extracted four times with methylene chloride. Paper chromatography indicates the presence of 7α-methylestrone (II) in the extract. The product (II) is isolated in accordance with the precedure described in Example 1 to give essentially pure 7α-methylestrone (II).

EXAMPLE 3

7α-methylestrone 3-methyl ether (III)

To 4 g. of 7α-methylestrone (II) in a solution containing 6.4 g. of potassium hydroxide, 14 ml. of water and 21 ml. of methanol, 14 ml. of dimethylsulfate is added dropwise with stirring and cooling sufficient to keep the reaction temperature at 25 to 35° C. At the same time a solution of 14 g. of potassium hydroxide in 28 ml. of water and 42 ml. of methanol is added dropwise at a rate that keeps the pH of the reaction mixture above 10. The addition of the dimethylsulfate requires about 30 minutes and the addition of the potassium hydroxide solution about 1 hour. The reaction mixture is stirred an additional 1.5 hours. Water is added and the crystalline product collected on a filter, washed with water and dried to yield 3.8 g. of product (III) melting at 155 to 163° C. It is recrystallized from methanol to give an analytical sample of 7α-methylestrone 3-methyl ether (III) melting point 163 to 165° C.;

$$\lambda_{max}^{alc.}\ 276\ m\mu;\ \epsilon = 2,050$$

*Analysis.*—Calcd. for $C_{20}H_{28}O_2$ (percent): C, 79.95; H, 9.39. Found (percent): C, 80.28; H, 9.48.

Following the procedure of Example 3 but substituting for dimethylsulfate the following:

(1) diethylsulfate,
(2) dipropylsulfate,
(3) diisopropylsulfate
(4) dibutylsulfate,
(5) di-s-butylsulfate,
(6) dipentylsulfate,
(7) dihexylsulfate,
(8) diheptylsulfate, and
(9) dioctylsulfate, yields, respectively, (1) 7α-methylestrone 3-ethyl ether (III),
(2) 7α-methylestrone 3-propyl ether (III),
(3) 7α-methylestrone 3-isopropyl ether (III),
(4) 7α-methylestrone 3-butyl ether (III),
(5) 7α-methylestrone 3-s-butyl ether (III),
(6) 7α-methylestrone 3-pentyl ether (III),
(7) 7α-methylestrone 3-hexyl ether (III),
(8) 7α-methylestrone 3-heptyl ether (III), and
(9) 7α-methylestrone 3-octyl ether (III).

EXAMPLE 4

7α-methylestradiol 3-methyl ether (IV)

To a slurry of 1 g. of 7α-methylestrone 3-methyl ether (III) in 50 ml. of 95% ethyl alcohol, 0.5 g. of sodium borohydride is added. The reaction mixture is stirred for about 1.5 hours, then about half of the solvent removed by an evaporation with a stream of nitrogen. The concentrated reaction mixture is diluted with about 200 ml. of water and the resulting precipitate collected, washed with water and dried to give 0.9 g. of 7α-methylestradiol 3-methyl ether (IV). Its infrared absorption spectrum supports its proposed structure.

EXAMPLE 5

7α-methyl-17β-hydroxy-$\Delta^{2,5(10)}$-estradiene 3-methyl ether (V)

To a solution of about 60 ml. of redistilled liquid ammonia, there is added, with cooling in a Dry-Ice (solid carbon dioxide)-acetone bath, 0.92 g. of 7α-methylestradiol 3-methyl ether (IV) in 30 ml. of purified tetrahydrofuran, 15 ml. of t-butyl alcohol and finally 0.6 g. of lithium wire cut in small pieces. After about 4.5 hours the solvents are evaporated with a fast stream of nitrogen. The product is precipitated by the addition of water, collected, washed well with water and dried to give crystalline 7α-methyl - 17β - hydroxy-$\Delta^{2,5(10)}$-estradiene 3-methyl ether (V), having a melting point of 100 to 108° C.

EXAMPLE 6

7α-methyl-17-keto-$\Delta^{2,5(10)}$-estradiene 3-methyl ether (VI)

The 7α-methyl - 17β - hydroxy-$\Delta^{2,5(10)}$-estradiene 3-methyl ether (V) obtained in Example 5 is dissolved in 100 ml. of toluene and about 10 ml. distilled to remove traces of water, next 9 ml. of cyclohexanone is added and the solution again dried by azeotropic distillation. Following the addtion of 0.9 g. of aluminum isopropoxide, the reaction mixture is stirred at reflux (under nitrogen) for about 1.5 hours. 5 ml. of water saturated with sodium potassium tartrate is added to the mixture and then steam passed through it (for about 10 minutes) until most of the cyclohexanone condensation products are removed. The precipitate formed during the steam distillation is extracted with ether, washed with saturated sodium potassium tartrate solution, dried and the solvent removed. A first crop of 7α-methyl-17-keto-estradiene 3-methyl ether (VI), weighing 0.3 g. and melting at 110 to 121° C., is obtained on crystallization from Skellysolve B. A second crop is obtained from methanol. It is recrystallized from methanol to give 100 mg. (VI) having a melting poit of 128 to 139° C.

EXAMPLE 7

7α-methyl-17α-ethynyl-17β-hydroxy-$\Delta^{2,5(10)}$-estradiene 3-methyl ether (VII)

To 0.3 g. of 7α-methyl-17-keto-$\Delta^{2,5(10)}$-estradiene 3-methyl ether (VI) dissolved in 10 ml. of dry toluene, cooled in an ice-bath, 0.6 g. of lithium acetylide-ethylene diamine complex is added. After about 3 hours an additional 0.3 g. of lithium acetylide-ethylene diamine is added. After about 7 hours, thin layer chromatography shows only a slight trace of starting material present in the reaction mixture. After cooling in an ice-bath water is added dropwise. The aqueous phase is separated, acidified with dilute acetic acid and extracted with toluene. The toluene phases are combined and washed with water, dried and the toluene evaporated to give an oily residue, which on addition of methanol yields partially crystalline 7α-methyl-17α-ethynyl-17β-hydroxy-$\Delta^{2,5(10)}$estradiene 3-methyl ether (VII).

Following the procedure of Example 7 but replacing lithium acetylide-ethylene diamine complex by its lithium methylacetylide, propylacetylide and butylacetylide counterparts, yields the respective 7α-methyl-17α-propynyl-17α-butynyl and -17α-pentynyl-17β-hydroxy-$\Delta^{2,5(10)}$-estradiene 3-methyl ethers (VII).

EXAMPLE 8

$\Delta^{5(10)}$ - 3-keto-7α-methyl-17β-hydroxy-17α-ethynylestrene (17α - ethynyl - 17β-hydroxy-7α-methyl-5(10)-estren-3-one) (VIII)

The 7α - methyl-17α-ethynyl-17β-hydroxy-$\Delta^{2,5(10)}$-estradiene 3-methyl ether (VII) obtained in Example 7 is dissolved in a solution (purged with nitrogen) containing 45 ml. of methanol, 6 ml. of water and 0.6 g. of oxalic acid. It is stirred for about 30 minutes and then about half of the solvent removed in a rotary evaporator. Water is added and the product extracted with ether. The ether extracts are washed sucessively with water, dilute sodium bicarbonate solution, again with water, dried and the solvent removed. The residue is dissolved in methylene chloride and the solution poured onto a 100 g. column of Florisil packed wet with Skellysolve B. Elution is between 3 l. of a mixture of 2% acetone in Skellysolve B and 3 l. of 10% acetone-Skellysolve B. Fractions containing VIII are combined and recrystallized from acetone-Skellysolve B to yield a product (VIII) melting at 152 to 160° C. This material is combined with that of a previous run and recrystallized from a mixture of acetone and Skellysolve B to yield 42 mg. of $\Delta^{5(10)}$-3-keto-7α-methyl-17β-hydroxy-17α-ethynylestrene (VIII), melting at 157 to 162° C. Its infrared absorption spectrum shows OH, ≡CH, C=O (non-conjugated) and C—O bands at 3475, 3250, 1709, 1190 (and 1143) cm.$^{-1}$, respectively.

*Analysis.*—Calcd. for $C_{21}H_{28}O_2$ (percent): C, 80.72; H, 9.03. Found (percent): C, 80.61; H, 9.27.

Following the procedure of Example 8 but substituting for 7α-methyl-17α-ethynyl-17β-hydroxy-Δ$^{2,5(10)}$-estradiene-3-methyl ether (VII), other 17α-alkynyl compounds such as the 17α-propynyl, 17α-butynyl and 17α-pentynyl counterparts, yields the respective Δ$^{5(10)}$-3-keto-7α-methyl-17β-hydroxy-17α-propynyl, 17α-butynyl and 17α-pentynyl estrenes (VIII).

METHOD B

EXAMPLE 9

*7α-methyl-3,5-androstadiene-3,17β-diol 3,17-diacetate (IX)*

A solution of 10 g. of the known compound 7α-methyl-17β-hydroxy-4-androsten-3-one (I), 1 g. of paratoluenesulfonic acid and 100 ml. of acetic anhydride in 400 ml. of toluene is refluxed under nitrogen for about 5 hours. The solution is washed with water containing a small amount of pyridine, then several times with water, dried over magnesium sulfate, filtered and the solvent removed to yield crystalline 7α-methyl-3,17β-dihydroxy-3,5-androstadiene 3,17-diacetate (IX). The product is dried thoroughly under high vacuum to remove the last traces of acetic anhydride.

Following the procedure of Example 9 but substituting for acetic anhydride other anhydrides such as those of propionic, butyric, valeric, hexanoic, lauric, trimethylacetic, isobutyric, isovaleric, t-butylacetic, β-cyclopentylpropionic, cyclohexylacetic, benzoic, phenylacetic, β-phenylpropioni, ortho-, meta- or para-toluic, undecylenic, propiolic, cinnamic, trifluoroacetic, chloroacetic and furoic acid and the like, yields the corresponding 3,17-diacylates of 7α-methyl-3,5-androstadiene-3,17β-diol (IX).

EXAMPLE 10

*7α-methyl-6β,17β-dihydroxy-4-androsten-3-one 17-acetate (X)*

The product of Example 9 (obtained from 10 g. of I), 7α - methyl - 3,5 - androstadiene-3,17β-diol 3,17-diacetate (IX), is dissolved in 240 ml. of chloroform, cooled in an ice bath, and 83 ml. of 0.8 N perphthalic acid in ether added. The ice in the bath is allowed to melt. After about 16 hours the solution is washed with water, dilute sodium bicarbonate solution, again with water, dried, filtered and concentrated to dryness. The residue is chromatographed through a 300 g. column of alumina and recrystallized from a mixture of acetone and Skellysolve B then from aqueous methanol to yield 4.55 g. of 7α-methyl-6β,17β-dihydroxy-4-androsten-3-one 17-acetate (X), melting at 195 to 197° C. An analytical sample has a melting point of 194 to 196° C., $$\lambda_{max.}^{alc.} \ 237 \ m\mu \ (\epsilon=14,150), \ [\alpha]_D+28° \ (chloroform)$$

*Analysis.*—Calcd. for $C_{22}H_{32}O_4$ (percent): C, 73.30; H, 8.95. Found (percent): C, 72.89; H, 9.13.

EXAMPLE 11

*7α-methyl-17β-hydroxy-6β,19-epoxy-4-androsten-3-one 17-acetate (XI)*

A solution of 1 g. of 7α-methyl-6β,17β-dihydroxy-4-androsten-3-one 17-acetate (X) (prepared as in Example 10), 5 g. of lead tetraacetate and 1 ml. of pyridine in 250 ml. of benzene is irradiated by ultraviolet light and cooled internally by a cold finger with tap water running through it. After about 2.25 hours the reaction mixture is filtered and the filtrate washed with water, dilute sodium bicarbonate solution, again with water, dried and the solvent removed. The residue is chromatographed through a 200 g. column of Florisil (synthetic magnesium silicate) with a gradient elution between 5 l. of Skellysolve B and 5 l. of 10% acetone-Skellysolve B. The product (XI) is recrystallized twice from acetone-Skellysolve B to give 7α-methyl-17β-hydroxy-6β,19-epoxy-4-androsten-3-one 17-acetete (XI), melting at 176 to 180° C.;

$$\lambda_{max.}^{alc.} \ 239 \ m\mu \ (\epsilon=12,350)$$

Infrared absorption and nuclear magnetic resonance spectra support the proposed structure.

*Analysis.*—Calcd. for $C_{22}H_{30}O_4$ (percent): C, 73.71; H, 8.44. Found (percent): C, 73.37; H, 8.06.

EXAMPLE 12

*7α-methyl-17β,19-dihydroxy-4-androsten-3-one 17-acetate (XII)*

Zinc dust (2.5 g.) is washed several times with 1:1 acetic acid and water then several times with glacial acetic acid. Care is taken to keep the zinc very wet at all times. To the activated zinc is added 100 mg. of 7α-methyl - 17β - hydroxy-6β,19-epoxy-4-androsten-3-one 17-acetate (XI) (prepared as in Example 11) in 2 ml. of acetic acid. The mixture is stirred and heated on a steam bath for 15 minutes. The excess zinc is filtered off and washed with acetic acid. The filtrate is concentrated to about 3 ml. with a rotary evaporator, diluted with ether, washed with water, dilute sodium bicarbonate solution, again with water and dried. The solvent is removed, to afford a residue. The residue is dissolved in methylene chloride and the solution chromatographed through a 100 g. column of Florisil. The column is eluted by gradient elution between 3 l. of 5% acetone-Skellysolve B and 3 l. of 20% acetone-Skellysolve B. The product (XII) is recrystallized from acetone-Skellysolve B to give 50 mg. of 7α-methyl-17β,19-dihydroxy-4-androsten-3-one 17-acetate (XII) melting at 158 to 159° C. and $$\lambda_{max.}^{alc.} \ 244 \ m\mu \ (\epsilon=14,800)$$

Nuclear magnetic resonance and infrared absorption spectra support the proposed structure.

EXAMPLE 13

*7α-methyl-17β,19-dihydroxy-4-androsten-3-one (XIII)*

A solution of 1 g. of 7α-methyl-17β,19-dihydroxy-4-androsten-3-one 17-acetate (XII) (prepared as in Example 12) in 100 ml. of absolute methanol containing 2 ml. of concentrated hydrochloric acid is purged with nitrogen, then refluxed for about 2 hours. The course of the reaction is readily followed by thin layer chromatography. The solution is concentrated and extracted with methylene chloride, washed with water, dilute sodium bicarbonate solution, again with water and the solvent removed. The resulting crude residue, 7α-methyl-17β,19-dihydroxy-4-androsten-3-one (XIII), can be used in Example 14 without purification or purified by chromatography on Florisil or other adsorbents and/or by crystalization.

EXAMPLE 14

*7α-methyl-3,17-dioxo-4-androsten-19-oic acid (XIV)*

A solution of 10 g. of 7α-methyl-17β,19β-dihydroxy-4-androsten-3-one (XIII) (prepared as in Example 13) is dissolved in 1 l. of acetone and 40 ml. of chromic acid solution (prepared from 27 g. of chromium trioxide and 23 ml. of concentrated sulfuric acid and diluted to 100 ml. with water) added dropwise at 10° C. with stirring. After 30 minutes the excess chromic acid is destroyed by dropwise addition of isopropanol. The reaction mixture is concentrated to about 200 ml. employing a rotary evaporator at below room temperature, diluted with water and extracted with methylene chloride. The extract is washed with about 30% ammonium sulfate solution, dried over sodium sulfate, filtered and concentrated to dryness under vacuum. The residue, 7α-methyl-3,17-dioxo-4-androsten-19-oic acid (XIV) is recrystallized from ether or acetone-Skellysolve B.

EXAMPLE 15

7α-methyl-5(10)-estrene-3,17-dione (XV)

A mixture of 10 g. of 7α-methyl-3,17-dioxo-4-androsten-19-oic acid (XIV) (prepared as in Example 14) and 10 ml. of pyridine is stirred at 50° C. for 1 hour and then concentrated with a rotary evaporator at about 40° C. The residue obtained is purified by recrystallization from acetone-Skellysolve B (or by chromatography on Florisil) to give 7α-methyl-5(10)-estrene-3,17-dione (XV).

EXAMPLE 16

7α-methyl-5(10)-estrene-3,17-dione 3-dimethyl ketal (XVI)

To a solution of 5 g. of malonic acid in 150 ml. of methanol, 10 g. of 7α-methyl-5(10)-estrene-3,17-dione (XV) (prepared as in Example 15) is added with stirring at 20 to 25° C. After keeping the reaction mixture at this temperature for between about 6 to 8 hours (while following the rate of reaction by thin layer chromatography) it is poured into ice water, saturated with sodium bicarbonate and then extracted with ether. The extract is washed with sodium bicarbonate solution, filtered and the solvent removed by evaporation. The product (XVI) is recrystallized from acetone hexane mixtures or chromatographed on Florisil to yield 7α-methyl-5(10)-estrene-3,17-dione 3-dimethylketal (XVI).

Following the procedure of Example 16 but substituting for methanol, the following alkanols:

(1) ethanol
(2) n-propanol and
(3) n-butanol, yields, respectively, (1) 7α-methyl-5(10)-estrene-3,17-dione 3-diethyl ketal (XVI),
(2) 7α-methyl-5(10)-estrene-3,17-dione 3-di-n-propyl ketal (XVI) and
(3) 7α-methyl-5(10)-estrene-3,17-dione 3-di-n-butyl ketal (XVI).

EXAMPLE 17

7α-methyl-17β-hydroxy-17α-ethynyl-5(10)-estren-3-one 3-dimethyl ketal (XVII)

A solution of 4 g. of 7α-methyl-5(10)-estrene-3,17-dione 3-dimethyl ketal (XVI) (prepared as in Example 16) is dissolved in 300 ml. of ether and 20 ml. of toluene, cooled to 0° C. and acetylene bubbled through the solution. A solution of 60 ml. of sodium t-amyloxide in toluene-t-amylalcohol is added dropwise. The solution is kept at 0° C. with acetylene bubbling through it for about 15 hours, then poured into a solution of ammonium chloride kept at −5° C. and extracted with ether. The ether extract is washed with cold ammonium chloride solution and dried. The solvent is removed and the residue recrystallized from ether or a mixture of ether and hexane (or purified on Florisil) to yield 7α-methyl-17β-hydroxy-17α-ethynyl-5(10)-estren-3-one 3-dimethyl ketal (XVII).

Following the procedure of Example 17 but substituting for acetylene the following:

(1) methylacetylene,
(2) ethylacetylene and
(3) propylacetylene, yields, respectively, (1) 7α-methyl-17β-hydroxy-17α(1-propynyl)-5(10)-estren-3-one dimethyl ketal (XVII),
(2) 7α-methyl-17β-hydroxy-17α(1-butynyl)-5(10)-estren-3-one 3-dimethyl ketal (XVII) and
(3) 7α-methyl-17β-hydroxy-17α(1-pentynyl)-5(10)-estren 3-dimethyl ketal (XVII).

EXAMPLE 18

7α-methyl-17β-hydroxy-17α-ethynyl-5(10)-estren-3-one 3-dimethyl ketal (XVII)

A suspension of sodium acetylide (20% in xylene) is centrifuged and the sludge slurried with 10 ml. of dimethylsulfoxide. A mixture of 2 g. of 7α-methyl-5(10)-estrene-3,17-dione 3-dimethyl ketal (XVI) (obtained as in Example 16) in 10 ml. of dimethylsulfoxide is mixed with the sodium acetylide. After keeping the mixture at room temperature for about a half hour, it is stored for about 16 hours. Water is added to the mixture and the product extracted with ether. The extracts are washed with dilute acid, sodium bicarbonate and water, and the solvent removed to give an oily residue. The residue is chromatographed through neutral alumina; recrystallization of the crude product gives pure 7α-methyl-17β-hydroxy-17α-ethynyl-5(10)-estren-3-one 3-dimethyl ketal (XVII).

Following the procedure of Example 18 but substituting the following acetylides for sodium acetylide:

(1) sodium methylacetylide,
(2) sodium ethylacetylide and
(3) sodium propylacetylide, yields, respectively, (1) 7α-methyl-17β-hydroxy-17α(1-propynyl)-5(10)-estren-3-one 3-dimethyl ketal (XVII),
(2) 7α-methyl-17β-hydroxy-17α(1-butynyl)-5(10)-estren-3-one 3-dimethyl ketal (XVII) and
(3) 7α-methyl-17β-hydroxy-17α(1-pentynyl)-5(10)-estren-3-one 3-dimethyl ketal (XVII).

EXAMPLE 19

$\Delta^{5(10)}$-3-keto-7α-methyl-17β-hydroxy-17α-ethynylestrene (7α-methyl-17β-hydroxy-17α-ethynyl-5(10)-estren-3-one) (VIII)

To a solution of 1 g. of 7α-methyl-17β-hydroxy-17α-ethynyl-5(10)-estren-3-one 3-dimethyl ketal (XVII) (prepared as in Examples 17 or 18) in 20 ml. of acetone in a nitrogen atmosphere, a solution of 0.4 g. of malonic acid in 6 ml. of water and 20 ml. of acetone is added. After between about 3 to about 5 hours at room temperature ether is added; the ether extract is washed with water, saturated sodium bicarbonate solution, again with water and dried over sodium sulfate. The solvent is removed leaving a residue of the product (VIII). It is recrystallized from a mixture of acetone and Skellysolve B, or alternatively purified by chromatography on a column of Florisil followed by recrysallization from acetone-Skellysolve B, until the product, 7α-methyl-17β-hydroxy-17α-ethynyl-5(10)-estren-3-one (VIII) reaches a melting point of 157 to 162° C.

Following the procedure of Example 19 but substituting for 7α-methyl-17β-hydroxy-17α-ethynyl-5(10)-estren-3-one 3-dimethyl ketal (XVII) the following representative starting materials:

(1) 7α-methyl-17β-hydroxy-17α(1-propynyl)-5(10)-estren-3-one 3-dimethyl ketal (XVII),
(2) 7α-methyl-17β-hydroxy-17α(1-butynyl)-5(10)-estren-3-one 3-dimethyl ketal (XVII) and
(3) 7α-methyl-17β-hydroxy-17α(1-pentynyl)-5(10)-estren-3-one 3-dimethyl ketal (XVII), yields, respectively, (1) 7α-methyl-17β-hydroxy-17α(1-propynyl)-5(10)-estren-3-one (VIII),
(2) 7α-methyl-17β-hydroxy-17α(1-butynyl)-5(10) estren-3-one (VIII), and
(3) 7α-methyl-17β-hydroxy-17α(1-pentynyl)-5(10)-estren-3-one (VIII).

The novel compounds of Formula VIII of the present invention can be incorporated into novel compositions which are useful pharmaceutical preparations demonstrating unexpected, advantageous and beneficial results in the treatment of ovulating mammals and birds, for example, to re-establish normal endome-trium-ovary-anterior pituitary relationships, in forestalling habitual and threatened abortion, in easing pre-menstrual tension and preventing ovulation in humans.

In the prevention of ovulation in ovulating mammals, especially humans, the novel compositions and processes employing the compounds of Formula VIII of the instant invention demonstrate especially beneficial and advantageous results, particularly in the area of lessened side effects, such as nausea, edema, break-through bleeding, thrombo-embolic afflictions, breast problems, weight gain, liver toxicity, virilization in the patient, and masculinization of a female fetus.

As indicated above, the compounds of Formula VIII of this invention are useful for their anti-fertility activity. Administration to mammals depends on the particular compound involved, route of administration and the individual's response thereto. In general, a dose of between about 0.01 mg. to about 100 mgs. of each of the compounds prepared in Example 8 and embraced within Formula VIII is given orally, subcutaneously or intramuscularly at such time(s) in the mammalian ovulatory cycle as is suitable for the prevention of ovulation.

The following examples illustrate the incorporation of a compound of Formula VIII of this invention in pharmaceutical formulation for use as anti-fertility agents, but are not to be construed as limiting.

EXAMPLE 20

Compressed tablets

A lot of 10,000 compressed tablets, each containing 0.05 mg. of 17α-ethynyl-17β-hydroxy-7α-methyl-5(10)-estren-3-one is prepared from the following ingredients:

| | Gm. |
|---|---|
| 17α-ethynyl-17β-hydroxy-7α-methyl-5(10)-estren-3-one | 0.5 |
| Dicalcium phosphate | 2500 |
| Methylcellulose, USP (15 cps.) | 65 |
| Talc, bolted | 450 |
| Calcium stearate, fine powder | 35 |

The 17α-ethynyl-17β-hydroxy-7α-methyl-5(10)-estren-3-one and dicalcium phosphate are mixed well, granulated with 7.5% solution of methylcellulose in water, passed through a No. 8 screen and dried at 120° F. The dried granules are passed through a No. 12 screen, mixed thoroughly with the talc and stearate and compressed into tablets.

A daily dose of 1 tablet on days 5 through 24 of the human menstrual cycle is effective in preventing conception.

EXAMPLE 21

Hard gelatin capsules

A lot of 1,000 hard gelatin capsules, each containing 0.5 mg. of 17α-ethynyl-17β-hydroxy-7α-methyl-5(10)-estren-3-one is prepared from the following ingredients:

| | Gm. |
|---|---|
| 17α-ethynyl-17β-hydroxy-7α-methyl - 5(10) - estren-3-one | 0.5 |
| Lactose | 150 |
| Calcium stearate | 2 |
| Talc | 3 |

The lactose, talc and stearate are mixed well and incorporated into the mixture. The whole is mixed well and filled into two-piece hard gelatin capsules.

A daily dose of 1 capsule on days 5 through 24 of the human menstrual cycle is effective in preventing ovulation.

EXAMPLE 22

Soft gelatin capsules

A batch of 1,000 soft gelatin capsules, each containing 0.5 mg. of 17α-ethynyl-17β-hydroxy-7α-methyl-5(10)-estren-3-one and corn oil is prepared from the following materials.

| | Gm. |
|---|---|
| 17α-ethynyl-17β-hydroxy-7α-methyl - 5(10) - estren-3-one | 0.5 |
| Corn oil, q.s. | |

A uniform dispersion of the active ingredient in the corn oil is prepared and the dispersion filled into soft gelatin capsules by conventional means.

A daily dose of 5 ml. given on days 5 through 24 of the human menstrual cycle is effective in preventing ovulation.

EXAMPLE 23

Aqueous oral suspension

An aqueous oral suspension containing in each 5 ml. 0.5 mg. of 17α-ethynyl-17β-hydroxy - 7α - methyl-5(10)-estren-3-one is prepared from the following materials:

| | Gm. |
|---|---|
| 17α-ethynyl-17β-hydroxy-7α-methyl-5(10) - estren-3-one, micronized | 1.0 |
| Methylparaben, USP | 7.5 |
| Propylparaben, USP | 2.5 |
| Saccharin sodium | 12.5 |
| Cyclamate sodium | 2.5 |
| Glycerin | 3000 |
| Tragacanth powder | 100 |
| Orange oil flavor | 10 |
| F.D. and C. orange dye | 7.5 |
| Deionized water, q.s. to 10,000 ml. | |

A daily dose of 5 ml. given on days 5 through 24 of the human menstrual cycle is beneficial in preventing ovulation.

EXAMPLE 24

Aqueous suspension for injection

A suspending vehicle is prepared from the following materials:

| | Gm. |
|---|---|
| Polyethylene glycol 4000 | 30 |
| Potassium chloride | 11.2 |
| Polysorbate 80 | 2 |
| Methylparaben | 1.8 |
| Propylparaben | 0.2 |
| Water for injection, q.s. | 1000 |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 100 g. of 17α-ethynyl-17β - hydroxy - 7α - methyl - 5(10)-estren-3-one, which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 100 mg. 17α-ethynyl-17β-hydroxy-7α-methyl-5(10)-estren-3-one.

A dose of 1 ml. of this suspension given by intramuscular injection every month is effective in preventing conception.

The replacement of 17α-ethynyl-17β-hydroxy-7α-methyl-5(10)-estren-3-one (VIII) in Examples 20 through 24 by comparable dosages of another compound of Formula VIII, e.g., the 17α-propynyl,17α-butynyl or 17α-pentynyl counterpart, provides a similarly effective non-fertile condition.

The compounds of Formula VIII of this invention when combined with estrogen, e.g., ethynyl estradiol, ethynyl estradiol 3-methyl ether, estradiol, estradiol 3-methyl ether, estradiol cyclopentylpropionate, estrone, estrone 3-methyl ether, diethylsilbesterol and the like, are useful for the prevention of ovulation in mammals. Administration to mammals depends on the particular estrogen and compound of Formula VIII involved and the individual's response thereto. In general, a dose of between about 0.01 mg. to about 5 mgs. of an estrogen, e.g., one of those set forth above, plus between about 0.01 mg. to about 100 mgs. of a compound of Formula VIII is given at such time(s) in the mammalian ovulatory cycle as is suitable for the prevention of ovulation.

The following examples illustrate the incorporation of a compound of Formula VIII of this invention with an estrogen in pharmaceutical formulation for use as anovulatory agents, but are not to be construed as limiting.

EXAMPLE 25

*Oral tablets*

50,000 tablets for oral administration are prepared from the following types and amounts of materials. Each tablet contains 3.0 mgs. of 17α-ethynyl-17β-hydroxy-7α-methyl-5(10)-estren-3-one and 0.03 mg. of ethynyl estradiol.

17α-ethynyl-17β-hydroxy-7α-methyl - 5(10) - estren-3-one _____oz__ 5
Ethynyl estradiol _____grains__ 23
Lactose _____lbs__ 3

The finely powdered active ingredients and lactose are mixed well and granulated with syrup-starch paste. Starch and calcium sterate are used as lubricants in the compressing step.

The oral administration of 1 tablet daily on days 5 through 24 of the human menstrual cycle is effective in preventing ovulation.

EXAMPLE 26

*Oral tablets*

10,000 tablets for oral administration are prepared from the following types and amounts of ingredients. Each tablet contains 10 mgs. of 17α-ethynyl-17β-hydroxy-7α-methyl-5(10)-estren-3-one and 0.05 mg. of ethynyl estradiol.

```
                                                    Gms.
17α-ethynyl-17β-hydroxy-7α-methyl-5(10) - estren-
  3-one _____ 100
Ethynyl estradiol _____ 0.5
Lactose _____ 2600
```

The finely powdered active ingredients and lactose are mixed well and granulated with syrup-starch paste. Starch talc and calcium sterate are used as lubricants in the compressing step.

The oral administration of 1 tablet daily on days 5 through 24 of the human menstrual cycle is effective in preventing conception.

EXAMPLE 27

*Oral aqueous suspension*

An aqueous suspension for oral administration, containing in each teaspoonful (approximately 5 mls.) 5 mgs. of 17α - ethynyl-17β-hydroxy-7α-methyl-5(10)-estrene-3-one and 0.2 mg. of ethynyl estradiol is prepared from the following types and amounts of ingredients:

17α-ethynyl-17β-hydroxy-7α-methyl - 5(10) - estren-3-one _____gm__ 1
Ethynyl estradiol _____mgms__ 40
Preservative _____gms__ 2
Flavor, q.s.
Purified water USP, a.s. and 1000 mls.

The preservative and flavor are dissolved in the water. The micronized active ingredients are added and the whole is homogenized.

A daily dose of 1 teaspoonful given on days 5 through 24 of the human menstrual cycle is beneficial in preventing ovulation.

EXAMPLE 28

*Oral gelatin capsules*

1,000 gelatin capsules for oral administration, each containing 10 mgs. of 17α-ethynyl-17β-hydroxy-7α-methyl-5(10)-estren-3-one and 0.05 mg. of ethynyl estradiol are prepared from the following types and amounts of materials:

17α-ethynyl-17β-hydroxy-7α-methyl - 5(10) - estren-3-one _____gms__ 10
Ethynyl estradiol _____mgms__ 50
Ingestible oil, q.s.

The micronized active ingredients and the oil are mixed and the mix is encapsulated by the usual techniques into gelatin capsules.

A daily dose of 1 capsule given on days 5 through 24 of the human menstrual cycle is beneficial in preventing conception.

EXAMPLE 29

*Oral tablets*

Following the procedure of Example 25, 5,000 tablets are prepared from the following types and amounts of ingredients.

Each tablet:
```
  5 mgs. 17α-ethynyl-17β-hydroxy - 7α - methyl-
    5(10)-estren-3-one _____gms__  25
  0.01 mg. ethynyl estradiol _____gms__  50
  150 mgs. lactose _____gms__ 750
  3 mgs. acacia _____gms__  15
  65 mgs. starch, bolted _____gms__ 325
  3 mgs. calcium sterate _____gms__  15
```

Good results in the inhibition of ovulation in humans are obtained at a daily dosage of 1 tablet orally on days 5 through 24 of the human menstrual cycle.

Tablets equally suited for the inhibition of ovulation are prepared by using 250 and 1000 mgs., respectively, of ethynyl estradiol in the place of the 50 mgs. in the above formulation.

The replacement of (a) 17α-ethynyl-17β-hydroxy-7α-methyl-5(10-estren-3-one (VIII) and (b) ethynyl estradiol in Examples 25 through 29 by comparable doses of (a) another compound of Formula VIII, e.g., the 17α-propynyl, 17α-butynyl or 17α-pentynyl counterpart, and (b) another estrogen, e.g., ethynyl estradiol 3-methyl ether, estradiol, estradiol 3-methyl ether, estradiol cyclopentylpropionate, estrone, estrone 3-methyl ether, diethylstilbesterol and the like, provides a similarly effective nonfertile condition.

As indicated above, the compounds of Formula VIII of this invention are useful for their anti-fertility activity. Administration to ovulating mammals and birds depends on the particular compound involved, route of administration and the individuals response thereto. In general a dose of between about 0.01 mg. to about 100 mgs. of each of the compounds prepared in Example 8 and embraced within Formula VIII is given orally, subcutaneously or intramuscularly at such time(s) in the mammalian or avian ovulatory cycle as is suitable for the prevention of ovulation.

The compositions embracing the compounds of Formula VIII of the present invention, are novel and useful pharmaceutical preparations demonstrating unexpected, advantageous and beneficial results in the treatment of ovulating mammals and birds, for example, by re-establishing normal endometrium-ovary-anterior pituitary relationships, by forestalling habitual and threatened abortion, and by preventing ovulation. In the practice of veterinary medicine, the compositions provide beneficial and advantageous results in the hormonal control of the reproductive cycle in animals, for example, by reducing the post-partum anestrual period in cattle; by increasing in animals the number of implanted fertilized ova, of live births and the viability thereof; by synchronization of the estrual period in a group of swine, cattle, horses, sheep, dogs or cats; by preventing estrual activity in fattening meat animals; by initiating cyclic activity in normal but non-cycling animals; by controlling the estrual period in individual animals; by shortening pseudopregnancy in dogs; and by providing compositions and methods to further weight gain with lessened side effects in beef cattle. In birds, there are provided compositions and methods to interrupt broodiness in laying hens, to control the moulting period and the egg laying period of a flock, and to increase the number of eggs. The species variations in the estrual periods of the mammals must be taken into account in the several uses of the inventive compositions. When cycling, cows, horses, sheep, swine, and cats have normal estrual periods from about 15 to about 25 days apart; dogs about 6 months apart. Thus, the treatment to synchronize the estrual period, whether oral or injectable, is continued for a maximum number of days ascertainable by reference to the normal length of the estrual period of the particular species. Prolonged prevention of the estrual periods is brought about by continued oral treatment or spaced administration of injectable suspensions with a prolonged effect.

In ruminants such as cattle, sheep and goats the novel compositions are surprisingly effective. Oral rations comprising an effective amount of the essential active ingredient for growth stimulation and a major amount of an ingestible feed carrier for ruminants provide advantageously beneficial results by increasing weight gain in feed lot heifers. Similar compositions provide advantageously beneficial results by synchronizing estrual periods in a group of cattle or ewes; by maintaining pregnanacy in repeat breeder heifers, cows and ewes; by allowing a breader to fix the estrual period an in individual heifer or ewe, for example, a prize heifer or ewe; by corrective treatment of cystic ovaries in heifers and cows; and by furthering mammary development and milk secretion in heifers or infertile cows in the absence of gestation. These oral rations comprise from about 0.000004% to about 0.0006% by weight of the essential active ingredient and a major amount of the ingestible feed carrier for ruminants which as aforesaid can be the usual dietary constituents of the ruminants. A feed lot heifer eating 15 to 25 lbs. per day of an oral composition containing preferably about 0.000004% by weight of the essential active ingredient, i.e. about 0.02 mg. per lb., receives a daily dosage of about 0.3 to about 0.5 mg. of said ingredient per day. An ewe eating 0.1 lb. per day of a ration comprising about 3 mg. of the active ingredient per lb. receives a daily dosage of about 0.3 mg. of said ingredient. By adjustment of the concentration of the essential active ingredient in feed supplements to the main diet the same dosage schedule can be maintained. The amount of such supplementary feed is usually 1 to 3 lbs. per day. A composition containing about 0.6 to 3 mg. per lb. provides a daily dosage of about 0.3 mg. per day to an ewe eating 0.1 to 0.5 lb. per day. Oral feeding of the inventive composition is preferred. However, administration of a bolus containing from about 0.1 to about 0.5 mg. of the essential active ingredient is satisfactory. Although such administration requires individual handling of the heifer or ewe, a breeder of a prize heifer or ewe may prefer administration by bolus over oral feeding in the diet.

The following examples illustrate the incorporation of a compound of Formula VIII of this invention is veterinary formulation as anti-fertility agents, but are not to be construed as limiting.

EXAMPLE 30

*Injectable suspension*

10,000 mls. of a sterile aqueous suspension are prepared from the following types and amounts of ingredients:

Each ml.: Total, gms.
125 mgs. 17α-ethynyl-17β-hydroxy-7α-methyl-
  5(10)-estren-3-one _____ 1250
9 mgs. sodium chloride _____ 90
q.s. water for injection U.S.P. ad, 10,000 mls.

The sodium chloride and a preservative are dissolved in the water and the whole is sterilized by passage through a sterilizing filter. The active ingredient is micronized, sterilized by exposure to sterilizing vapor and added aseptically to the sterile aqueous solution. Dispersion is accomplished by passing through a sterile homogenizer. The final suspension is filled aseptically into sterile vials.

The duration of action of the injected suspension is prolonged. The single injection of 4 mls. per animal in a group of beef cattle is effective in preventing estrus for from about 50 to about 100 days.

EXAMPLE 31

*Oral suspension*

4000 mls. of a fluid drop preparation suitable for the addition of measured amounts to animal feed is prepared from the following types and amounts of ingredients:

Gms.
Preservative _____ 14
Surfactant _____ 3.6
17α-ethynyl-17β - hydroxy - 7α-methyl - 5(10)-estren-
  3-one _____ 20
Purified water U.S.P. q.s. ad, 4000 mls.

The preservative is added to 500 mls. of the water at about 55° C. The surfactant is added followed by the micronized active ingredient. The whole is made up to volume with the balance of the water and passed through an homogenizer.

For the control of the estrual period of a 10 kilo bitch, 2 ml. is added daily to the animal ration, providing a daily dosage of 10 mgs. of the steroid (VIII) equivalent to 1 mg. per kilo of dog weight per day. After cessation of treatment the animal comes into heat and can be bred successfully.

For synchronization of the moulting period in poultry, 400 mls. is mixed daily into 50 lbs. of feed mash for a flock of 100 heavy breed (5.5 lbs.) hen chickens, providing a daily dosage in one-half pound of the mash of 20 mgs. of the steroid (VIII) equivalent to about 8 mgs. per kilo of hen weight per day. After cessation of treatment the chickens begin to lay concurrently.

EXAMPLE 32

*Ready-mix feed composition*

A mash feed mix for hen chickens is prepared from the following types and amounts of materials:

Laying mash _____lbs__ 100
17α - ethynyl - 17β - hydroxy - 7α - methyl - 5(10)-
  estren-3-one (micronized) _____gms__ 4

The active ingredient is micronized and worked into a portion of the mash by careful mixing, and the mix is incorporated uniformly into the remaining mash. Each pound of the finished preparation contains 40 mgs. of the steroid acetate, providing a daily dose of 20 mgs. for a heavy breed hen eating one-half pound of the mash per day. This daily dose is effective in controlling the moulting period.

Example 33

*Implantable composition*

10,000 pellets for implantation in beef cattle are prepared from the following types and amounts of materials:

|  | Gms. |
|---|---|
| 17α - ethynyl - 17β-hydroxy - 7α-methyl - 5(10)-estren-3-one | 200 |

The active ingredient is blended with an inert diluent into a uniform mixture. The mixture is slugged and screened to a granular consistency. A lubricant is added and the granules are compressed into pellets, each containing 20 mgs. of the anovulatory compound.

Good results in the weight increase of growing beef cattle are obtained by implantation of one pellet at the time the cattle go on full feed for fattening.

Example 34

*Ingestible pre-mix*

10,000 gms. of a pre-mix is prepared from the following types and amounts of ingredients:

|  | Gms. |
|---|---|
| 17α - ethylnyl - 17β - hydroxy-7α - methyl - 5(10)-estren-3-one | 50 |
| Soybean meal | 9950 |
| Chloroform, U.S.P., 1500 mls. | |

A chloroform solution of the active ingredient is prepared and incorporated gradually and uniformly into the soybean meal. After adequate mixing the whole is dried to remove any trace of chloroform.

Each gram of the pre-mix contains 5 mgs. of the steroid. Two kilograms of the pre-mix is added to 1 ton of the standard ration of a group of gilts to provide 5 mgs. per pound of feed which furnishes a daily dose to each gilt of 25 mgs. of the steroid (VIII) when the animal is fed at the rate of 5 lbs. finished feed per day. Treatment throughout gestation results in an increased number of pigs at farrowing.

An equally satisfactory pre-mix is prepared by omitting the chloroform, grinding the active ingredient into a fine powder, which is added to the soybean meal with mixing, and using mineral oil as an antidust. This gives a uniform pre-mix which is well suited for later incorporation into the animal ration.

Example 35

*Bolus*

9000 boluses, each containing 45 mgs. of the steroid, are prepared from the following types and amounts of ingredients:

|  | Gms. |
|---|---|
| 17α - ethynyl - 17β-hydroxy - 7α - methyl - 5(10)-estren-3-one | 405 |
| Lactose | 59,535 |

The above ingredients are blended and granulated with syrup-starch paste. The granulation is then dried, lubricated with starch, talc and calcium stearate powders, and compressed.

The oral administration to a cycling mare of four boluses per day is effective in the control of estrus. The treatment is especially advantageous in racing mares.

Example 36

*Tablet*

10,000 compressed tablets are prepared from the following types and amounts of ingredients:

| Each tablet: | Total, gms. |
|---|---|
| 0.05 mg. 17α-ethynyl - 17β-hydroxy - 7α-methyl-5(10)-estren-3-one, 500 mgs. | |
| 150 mgs. lactose | 1500 |
| 3 mgs. acacia | 30 |
| 65 mgs. starch, bolted | 650 |
| 3 mgs. calcium stearate | 30 |

The first three ingredients are powdered and mixed well. The mixture is granulated with syrup-starch paste and dried. The dried granules are well mixed with a starch-calcium stearate lubricant mixture. The whole is compressed into tablets.

Good results are obtained in the prevention of the estrual period in smaller dogs weighing about 5 lbs., one tablet being administered daily.

Example 37

*Hard gelatin capsule*

1000 hard gelatin, two-piece capsules for oral administration, each containing 100 mgs. of the essential active ingredient, are prepared from the following types and amounts of materials:

|  | Gms. |
|---|---|
| 17α - ethynyl - 17β-hydroxy - 7α-methyl - 5(10)-estren-3-one | 100 |

The micronized steroid is encapsulated by the usual techniques in two-piece capsules.

A daily dose of 1 capsule gives good results in the control of the estrual period in a mare. After cessation of treatment, the mares can be bred successfully at approximately the same time.

Example 38

*Ready-mix feed composition*

Ready-mixed feed is prepared in the following manner:

| | |
|---|---|
| Commercial dog feed lbs. | 100 |
| 17α - ethynyl - 17β-hydroxy-7α-methyl-5(10)-estren-3-one mgs. | 20 |

The steroid is worked into a portion of the feed by careful mixing and milling. This mix is incorporated uniformly into the remaining feed. Each pound of the finished preparation contains 0.2 mg. of the steroid providing a total daily dose of 0.25 mg. for a 10 kilo dog eating 1¼ lb. of the feed per day. This daily dose is effective in preventing estrus in the female dog.

Example 39

*Ingestible pre-mix*

Following the procedure of Example 34, a pre-mix is prepared to provide 0.5 mg. of 17α-ethynyl-17β-hydroxy-7α-methyl-5(10)-estren-3-one per pound of ration.

Individual feeding of dairy heifers of known reproductive history was studied. Feeding began on the 15th day of the estrual cycle and continued through day 30. Twice daily observations for estrus and rectal palpation of the ovaries provided data on the effectiveness of the treatment.

Once daily feedings equivalent to between 2 and 25 mgs. of the essential active ingredient inhibited ovulation. With feedings equivalent to 2 and 25 mgs. per day, the average days for return to estrus was 3.5 and 10.0 days respectively after cessation of treatment.

The replacement of 17α-ethynyl-17β-hydroxy-7α-methyl-5(10)-estren-3-one (VIII) in Examples 30 through 39 by comparable dosages of another compound of Formula VIII, e.g., the 17α-propynyl, 17α-butynyl or 17α-pentynyl counterpart, provides a similarly effective non-fertile condition.

The compounds of Formula VIII of this invention when combined with an estrogen, e.g., ethynyl estradiol, ethynyl estradiol 3-methyl ether, estradiol, estradiol 3-methyl ether, estradiol cyclopentylpropionate, estrone, estrone 3-methyl ether, diethylstilbesterol and the like, are useful for the prevention of ovulation in birds and mammals. Administration to birds and mammals depends on the particular estrogen and compound of Formula VIII involved and the individual's response thereto. In general, a dose of between about 0.01 mg. to about 5 mgs. of an estrogen, e.g., one of those set forth above, plus between about 0.01 mg. to about 100 mgs. of a compound of Formula VIII is given at such time(s) in the avian or mammalian ovulatory cycle as is suitable for the prevention of ovulation.

The following examples illustrate the incorporation of a compound of Formula VIII of this invention with an estrogen in pharmaceutical formulation for use as avian and mammalian anovulatory agents, but are not to be construed as limiting.

EXAMPLE 40

*Injectable suspension*

10,000 mls. of a sterile aqueous suspension are prepared from the following types and amounts of ingredients:

Each ml.:                                         Total, gms.
   125 mgs. 17α-ethynyl-17β-hydroxy-7α-methyl-
      5(10)-estren-3-one _____ 1250
   1.25 mgs. ethynyl estradiol _____ 12.5
   9 mgs. sodium chloride _____ 90
   q.s. water for injection U.S.P. ad, 10,000 mls.

The sodium chloride and a preservative are dissolved in the water and the whole is sterilized by passage through a sterilizing filter. The active ingredients are micronized, sterilized by exposure to sterilizing vapor and added aseptically to the sterile aqueous solution. Dispersion is accomplished by passing through a sterile homogenizer. The final suspension is filled aseptically into sterile vials.

The duration of action of the injected suspension is prolonged. The single injection of 4 mls. per animal in a group of beef cattle is effective in preventing estrus for from about 50 to about 100 days.

EXAMPLE 41

*Oral suspension*

4000 mls. of a fluid drop preparation suitable for the addition of measured amounts to animal feed is prepared from the following types and amounts of ingredients:

Gms.
Preservative _____ 14
Surfactant _____ 3.6
17α - ethynyl - 17β - hydroxy - 7α - methyl-5(10)-
   estren-3-one _____ 20
Ethynyl estradiol _____ 0.5
Purified water U.S.P. q.s. ad, 4000 mls.

The preservative is added to 500 mls. of the water at about 55° C. The surfactant is added followed by the micronized active ingredients. The whole is made up to volume with the balance of the water and passed through an homogenizer.

For control of the estrual period of a 10 kilo bitch, 2 ml. is added daily to the animal ration, providing a daily dosage of 10 mgs. of the $\Delta^{5(10)}$-steroid and 0.025 mg. of ethynyl estradiol, equivalent to 1 mg. and 0.0025 mg. per kilo, respectively, of dog weight per day. After cessation of treatment the animal comes into heat and can be bred successfully.

For synchronization of the moulting period in poultry, 400 mls. is mixed daily into 50 lbs. of feed mash for a flock of 100 heavy breed (5.5 lbs.) hen chickens, providing a daily dosage in one-half pound of the mash of 20 mgs. of the $\Delta^{5(10)}$-steroid and 0.05 mg. of ethynyl estradiol, equivalent to about 8 mgs. and 0.02 mg. per kilo, respectively, of hen weight per day. After cessation of treatment the chickens begin to lay concurrently.

EXAMPLE 42

*Ready-mix feed composition*

A mash feed mix for hen chickens is prepared from the following types and amounts of materials:

Laying mash _____lbs__ 100
17α - ethynyl - 17β - hydroxy - 7α - methyl-5(10)-
   estren-3-one (micronized) _____gms__ 4
Ethynyl estradiol _____gm__ 0.16

The active ingredients are micronized and worked into a portion of the mash by careful mixing, and the mix is incorporated uniformly into the remaining mash. Each pound of the finished preparation contains 40 mgs. of the $\Delta^{5(10)}$-steroid and 0.016 mg. of ethynyl estradiol, providing a daily dose of 20 mgs. and 0.008 mg., respectively, for a heavy breed hen eating one-half pound of the mash per day. This daily dose is effective in controlling the moulting period.

EXAMPLE 43

*Implantable composition*

10,000 pellets for implantation in beef cattle are prepared from the following types and amounts of materials:

Gms.
17α - ethynyl - 17β - hydroxy - 7α - methyl - 5(10)-
   estren-3-one _____ 200
Ethynyl estradiol _____ 1

The active ingredients are blended with an inert diluent into a uniform mixture. The mixture is slugged and screened to a granular consistency. A lubricant is added and the granules are compressed into pellets, each containing 20 mgs. of the $\Delta^{5(10)}$-compound and 0.01 mg. of ethynyl estradiol.

Good results in the weight increase of growing beef cattle are obtained by implantation of one pellet at the time the cattle go on full feed for fattening.

EXAMPLE 44

*Ingestible pre-mix*

10,000 gms. of a pre-mix is prepared from the following types and amounts of ingredients:

Gms.
17α-ethynyl - 17β - hydroxy - 7α - methyl-5(10)-
   estren-3-one _____ 50
Ethynyl estradiol _____ 1
Soybean meal _____ 9950
Chloroform, U.S.P., 1500 mls.

A chloroform solution of the active ingredients are prepared and incorporated gradually and uniformly into the soybean meal. After adequate mixing the whole is dried to remove any trace of chloroform.

Each gram of the pre-mix contains 5 mgs. of the $\Delta^{5(10)}$-steroid and 0.1 mg. of ethynyl estradiol. Two kilograms of the pre-mix is added to 1 ton of the standard ration of a group of gilts to provide 5 mgs. and 0.1 mg., respectively, per pound of feed, which furnishes a daily dose to each gilt of 25 mgs. of the $\Delta^{5(10)}$-steroid and 0.5 mg. of ethynyl estradiol when the animal is fed at the rate of 5 lbs. finished feed per day. Treatment throughout gestation results in an increased number of pigs at farrowing.

An equally satisfactory pre-mix is prepared by omitting the chloroform, grinding the active ingredient into a fine powder, which is added to the soybean meal with mixing, and using mineral oil as an antidust. This gives a uniform pre-mix which is well suited for later incorporation into the animal ration.

EXAMPLE 45

*Bolus*

9000 boluses, each containing 45 mgs. of the $\Delta^{5(10)}$-steroid and 2 mgs. of ethynyl estradiol are prepared from the following types and amounts of ingredients:

Gms.
17α-ethynyl - 17β - hydroxy - 7α - methyl-5(10)-
   estren-3-one _____ 405
Lactose _____ 59,535
Ethynyl estradiol _____ 20.25

The above ingredients are blended and granulated with syrup-starch paste. The granulation is then dried, lubricated with starch, talc and calcium stearate powders, and compressed.

The oral administration to a cycling mare of four boluses per day is effective in the control of estrus. The treatment is especially advantageous in racing mares.

EXAMPLE 46

Tablet 10,000 compressed tablets are prepared from the following types and amounts of ingredients:

| Each tablet: | Total, gms. |
|---|---|
| 2.5 mgs. 17α-ethynyl-17β-hydroxy-7α-methyl-5(10)-estren-3-one | 25 |
| 0.1 mg. ethynyl estradiol | 1 |
| 150 mgs. lactose | 1500 |
| 3 mgs. acacia | 30 |
| 65 mgs. starch, bolted | 650 |
| 3 mgs. calcium stearate | 30 |

The first four ingredients are powdered and mixed well. The mixture is granulated with syrup-starch paste and dried. The dried granules are well mixed with a starch-calcium stearate lubricant mixture. The whole is compressed into tablets.

Good results are obtained in the prevention of the estrual period in smaller dogs weighing about 5 lbs., one tablet being administered daily.

EXAMPLE 47

Hard gelatin capsule 1000 hard gelatin, two-piece capsules for oral administration, each containing 500 mgs. of the $\Delta^{5(10)}$-steroid (VIII) and 10 mgs. of ethynyl estradiol, are prepared from the following types and amounts of materials:

| | Gms. |
|---|---|
| 17α-ethynyl-17β-hydroxy-7α-methyl-5(10)-estren-3-one | 500 |
| Ethynyl estradiol | 10 |

The micronized steroid is encapsulated by the usual techniques in two-piece capsules.

A daily dose of 1 capsule gives good results in the control of the estrual period in a mare. After cessation of treatment, the mares can be bred successfully at approximately the same time.

EXAMPLE 48

Ready-mix feed composition

Ready-mixed feed is prepared in the following manner:

| | |
|---|---|
| Commercial dog feed _____lbs__ | 100 |
| 17α-ethynyl-17β-hydroxy-7α-methyl-5(10)-estren-3-one _____mgs__ | 1000 |
| Ethynyl estradiol _____mgs__ | 10 |

The steroids are worked into a portion of the feed by careful mixing and milling. This mix is incorporated uniformly into the remaining feed. Each pound of the finished preparation contains 10 mgs. of the $\Delta^{5(10)}$-steroid and 0.1 mg. of ethynyl estradiol, providing a total daily dose of 12.5 mgs. and 0.125 mg., respectively, for a 10 kilo dog eating 1¼ lb. of the feed per day. This daily dose is effective in preventing estrus in the female dog.

EXAMPLE 49

Ingestible pre-mix

Following the procedure of Example 44, a pre-mix is prepared to provide 2 mgs. of 17α-ethynyl-17β-hydroxy-7α-methyl-5(10)-estren-3-one and 0.02 mg. ethynyl estradiol per pound of ration.

Individual feeding of dairy heifers of known reproductive history was studied. Feeding began on the 15th day of the estrual cycle and continued through day 30. Twice daily observations for estrus and rectal palpation of the ovaries provided data on the effectiveness of the treatment.

Once daily feedings equivalent to between 8 mgs. of the $\Delta^{5(10)}$-steroid and 0.08 mg. of ethynyl estradiol and 80 mgs. and 0.8 mg. of the respective compounds inhibited ovulation. With feedings equivalent to the foregoing daily doses, the average days for return to estrus was 3.5 and 10.0 days respectively after cessation of treatment.

The replacement of (a) 17α-ethynyl-17β-hydroxy-7α-methyl-5(10)-estren-3-one (VIII) and (b) ethynyl estradiol in Examples 40 through 49 by comparable doses of (a) another compound of Formula VIII, e.g., the 17α-propynyl, 17α-butynyl or 17α-pentynyl counterpart, and (b) another estrogen, e.g., ethynyl estradiol 3-methyl ether, estradiol, estradiol 3-methyl ether, estradiol cyclopentylpropionate, estrone, estrone 3-methyl ether, diethylstilbesterol and the like, provides a similarly effective non-fertile condition.

What is claimed is:
1. A pharmaceutical composition comprising:
    (a) about 0.01 to about 100 mgs. of 17α-ethynyl-17β-hydroxy-7α-methyl-5(10)-estren-3-one, and
    (b) about 0.01 mg. to about 5 mgs. of an estrogen, dispersed in a pharmaceutical carrier.
2. A composition in accordance with claim 1 wherein the estrogen is ethynyl estradiol.
3. A method of preventing ovulation in ovulating mammals comprising:
    administering to ovulating mammals an effective amount of
    (a) 17α-ethynyl-17β-hydroxy-7α-methyl-5(10)-estren-3-one, and
    (b) an estrogen.
4. A method of preventing ovulation in mammals in accordance with claim 3 wherein the estrogen is ethynyl estradiol.

References Cited

FOREIGN PATENTS

| 749,357 | 12/1966 | Canada | 260—397.45 |
| 6406797 | 12/1965 | Netherlands | 260—397.4 |

ELBERT L. ROBERTS, Primary Examiner

U.S. Cl. X.R.

260—239.55, 397.1, 397.3, 397.4, 397.5